United States Patent [19]
Sokolik et al.

[11] Patent Number: 6,106,883
[45] Date of Patent: *Aug. 22, 2000

[54] METHOD OF SUSPENDING INCLUSIONS

[75] Inventors: Linda Sokolik, Clifton; James A. Lewis, Park RIdge, both of N.J.; William F. Chalupa, Chestnut Ridge, N.Y.

[73] Assignee: Bush Boake Allen, Inc., Montvale, N.J.

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/548,118

[22] Filed: Oct. 25, 1995

Related U.S. Application Data

[63] Continuation-in-part of application No. 08/406,211, Jan. 27, 1995, Pat. No. 5,562,939.

[51] Int. Cl.[7] ............................... A23L 1/05; A23L 1/275
[52] U.S. Cl. ...................... 426/573; 426/575; 426/576; 426/577; 426/590; 426/599; 426/592
[58] Field of Search ..................................... 426/573–579, 426/576, 599, 590, 592, 577, 593

[56] References Cited

U.S. PATENT DOCUMENTS

| | | | |
|---|---|---|---|
| 2,834,679 | 5/1958 | Stoloff | 426/590 |
| 2,853,386 | 9/1958 | Hughes | 426/576 |
| 4,092,437 | 5/1978 | Claasen | 426/573 |
| 4,219,572 | 8/1980 | Jackman | 426/69 |
| 4,382,966 | 5/1983 | Mickus | 426/69 |
| 4,503,084 | 3/1985 | Baird et al. | 426/573 |
| 5,102,676 | 4/1992 | Aldcroft et al. | 426/423 |
| 5,376,396 | 12/1994 | Clark | 426/573 |
| 5,562,939 | 10/1996 | Lewis | 426/250 |

*Primary Examiner*—Carolyn Paden
*Attorney, Agent, or Firm*—Richard R. Muccino

[57] ABSTRACT

A method for suspending inclusions in an acidic or alcoholic liquid composition is provided. The method includes the steps of preparing a pre-gel solution including gellan gum in water, providing a liquid composition having inclusions, incorporating the pre-gel solution into the liquid composition, and acidifying the liquid composition to produce a beverage and suspend the inclusions in the beverage. Alternatively, the liquid composition can be provided without inclusions and the inclusions may be added after the pre-gel solution is incorporated into the liquid composition to form a suspending solution or after the suspending solution is acidified to produce a beverage.

27 Claims, No Drawings

METHOD OF SUSPENDING INCLUSIONS

This is a continuation-in-part of U.S. patent application Ser. No. 08/406,211, filed Jan. 27, 1995 now U.S. Pat. No. 5,562,939.

FIELD OF THE INVENTION

This invention relates generally to inclusions in liquid compositions and in particular, to a method of suspending such inclusions in a liquid composition.

BACKGROUND OF THE INVENTION

Inclusions in a liquid composition are more visually attractive if the inclusions are suspended throughout the liquid composition. For example, it is often desirable to incorporate particulate matter or inclusions in beverages. However, there is a tendency for such inclusions to sink to the bottom or float to the top of the beverage. This is especially true if the inclusions are larger than about one (1) cubic millimeter.

Prior art methods of preventing inclusions from sinking to the bottom or floating to the top of a beverage have met with only limited success. For example, one standard method for making beverage flavoring or clouding emulsions is to make the density of the inclusions or particulates identical to the density of the surrounding aqueous phase. However, this requires that permitted weighting agents must be dissolved in the oil phase of the emulsion. As a result, this method is only useful for small inclusions of the order of about 3 to 10 microns.

For larger particles, gravity balancing may be achieved, but only for one set of conditions, e.g. solids content of the beverage, solids content of the particles or inclusions, size of the particles or inclusions, and temperature. Variation from this fixed set of conditions invariably leads to separation.

Increasing the viscosity of the liquid composition using certain gums and starches is a technique that can be used to delay separation, but leads to unpleasant mouthfeel in the final product.

A method of suspending inclusions in an acidic or alcoholic liquid composition is disclosed and claimed in copending U.S. patent application Ser. No. 08/406,211, filed Jan. 27, 1995. In the method disclosed therein, a pre-gel solution including between about 0.2% and 1.5% by weight gellan gum in water is prepared, an acidic or alcoholic liquid composition having inclusions is provided, the pre-gel solution is incorporated into the liquid composition to form a suspending solution, the suspending solution is permitted to rest for a predetermined period of time, and the rested suspending solution is then agitated to suspend the inclusions.

In the method described in the copending application, it is sometimes necessary to incorporate the pre-gel solution into the liquid composition at an elevated temperature. In practice, this is considered undesirable since elevated temperatures require increased energy usage and result in increased processing costs.

It would, therefore, be desirable to provide an improved method for suspending inclusions in a liquid composition.

It is a goal of the invention to provide an improved method for suspending inclusions or particulates in a liquid composition.

It is another goal of the invention to provide a method for suspending inclusions or particulates in a liquid composition or beverage using minimal energy.

Still other goals and advantages of the invention will in part be obvious and will in part be apparent from the specification.

SUMMARY OF THE INVENTION

A method for suspending inclusions in a liquid composition is provided. The method includes the steps of preparing a pre-gel solution including gellan gum in water, providing a liquid composition having inclusions at a substantially neutral pH, incorporating the pre-gel solution into the liquid composition to form a pre-gel incorporated liquid composition, and acidifying the pre-gel incorporated liquid composition to yield a beverage and suspend the inclusions. Alternatively, the liquid composition can be provided without inclusions and the inclusions may be added after the pre-gel solution is incorporated into the liquid composition or after the pre-gel incorporated liquid composition has been acidified to yield a beverage.

The invention accordingly comprises the several steps and the relation of one or more of such steps with respect to each of the others thereof, which will be exemplified in the method hereinafter disclosed, and the scope of the invention will be indicated in the claims.

DETAILED DESCRIPTION OF THE PREFERRED EMBODIMENTS

The first step in the method of suspending inclusions in a liquid composition having an acidic pH is to provide a pre-gel solution. The pre-gel solution is a non-gelling solution including gellan gum in water. In an alternate embodiment, other gums such as xanthan gum, carrageenan, carboxy methyl cellulose, locust bean gum pectin, and the like and mixtures thereof may be used in addition to the gellan gum.

Gellan gum is a fermentation hydrocolloid produced by Kelco Corp., San Diego, Calif. and is used in an amount between about 0.2% and 1.5% by weight of the solution, preferably in an amount between about 0.5% an 0.75% by weight. Other gums may be used in addition to the gellan gum in amounts between about 0.10% and 1.0% by weight of the solution, preferably in amounts between about 0.15% and 0.70% by weight.

The water is potable and may be treated or de-ionized prior to use. If the water has not been treated or de-ionized, it is generally desirable to incorporate a suitable sequestrant. Suitable sequestrants include, but are not limited to, sodium citrate, potassium citrate, sodium hexametaphosphate, sodium tripolyphosphate and mixtures thereof in amounts ranging between about 0.1% and 0.5% by weight, preferably in amounts ranging between about 0.2% and 0.35% by weight.

The gellan gum, optional other gums, water, and optional sequestrant are combined at room temperature and heated to a temperature between about 120° and 200° F., preferably between about 150° and 190° F., most preferably between about 180° and 190° F., to yield a heated pre-gel solution. The solution may be stirred during the heating step and the heating step is continued until the solution becomes clear, thereby indicating that all of the gellan gum has become hydrated. In general, the heating step is continued for a period of between about 2 and 5 minutes, preferably between about 3 and 4 minutes. The clear, heated pre-gel solution is allowed to cool to yield a pre-gel solution. It is important that the pre-gel solution does not gel upon cooling, but remain in a fluid, pumpable condition. The cooled pre-gel solution has the consistency of a viscous, syrupy liquid.

A liquid composition having inclusions is provided. The liquid composition has a substantially neutral pH and is generally prepared using at least a sweetening agent and water. However, it is understood that as defined in accordance with the invention, the "liquid composition" may be water, mineral water, flavored water, seltzer, and the like even though such "liquid compositions" may not, in fact, be compositions.

Sweeteners include both natural and artificial sweeteners and may be selected from the following non-limiting list: sugars such as sucrose, glucose (corn) syrup, dextrose, invert sugar, fructose, and mixtures thereof; saccharine and its various salts such as the sodium or calcium salt; the dipeptide sweeteners such as aspartame; dihydrochalcone; glycyrrhizin; Stevia rebaudiana (Stevioside); and sugar alcohols such as sorbitol, mannitol, xylitol, and the like. Also contemplated as an additional sweetener is the nonfermentable sugar substitute (hydrogenated starch hydrosylate) which is described in U.S. Reissue Pat. No. 26,959. Also contemplated is the synthetic sweetener 3,6-dihydro-6-methyl-1-1,2,3-oxathiazin-4-one-2,2-dioxide particularly the potassium (Acesulfame-K), sodium and calcium salts thereof as described in German Patent No. 2,001,017.7.

The sweetener can be used in solid or dissolved form. When sucrose is used, it is generally present in an amount between about 9% and 12% by weight of the liquid composition. Other sweetening agents may be used in amounts acceptable to produce a beverage. It will be understood that these amounts are dependent on the sweetening power of each sweetening agent. Food-grade flavors and colors may also be incorporated into the liquid composition and desirable amounts of such components can readily be determined by one skilled in the art.

When the liquid composition includes at least water and a sweetening agent it is generally prepared at ambient room temperature, normally between about 60° and 80° F.

The liquid composition may also be alcoholic. When the liquid composition is alcoholic, the alcohol content will generally range between about 5% and 40% by volume.

The liquid composition can be hot or cold, carbonated or non-carbonated, alcoholic or non-alcoholic, caffeinated or non-caffeinated, clear or cloudy. Suitable liquid compositions include, but are not limited to, water, flavored drinks, milk, mouthwash, and the like provided that such compositions have an essentially neutral pH.

The liquid composition may have inclusions in an amount between about 1% and 10% by weight, preferably in an amount between about 3 and 8% by weight. Such inclusions are, for example and without limitation, pieces of a jelly-like substance as disclosed in a co-pending U.S. patent application Ser. No. 08/383,038, filed on Feb. 3, 1995, fruit pulp cells, fruit pulp particles, fruit pieces, gold particles, droplets of flavoring or clouding agents, and the like.

In an alternate embodiment provided in accordance with the invention, the liquid composition is provided without inclusions. When the liquid composition is provided without inclusions, such inclusions may be added after the pre-gel solution is incorporated into the liquid composition or after the pre-gel incorporated liquid composition is acidified to yield a beverage.

The pre-gel solution is incorporated into the liquid composition in an amount between 2% and 17.5% by volume to form a suspending solution. The pre-gel solution can be incorporated into the liquid composition at a temperature between about 400 (refrigerated) and 120° F. No shear is required to incorporate the pre-gel solution into the liquid composition. The final pre-gel incorporated liquid composition or suspending solution has between about 0.02% and 0.05% by weight gellan gum. If no inclusions are present in the liquid composition, they may be added to the pre-gel incorporated liquid composition.

After the suspending solution is prepared, acid is added to bring the pH to between about 2.5 and 6.0, preferably between about 2.5 and 4.0, more preferably between about 2.6 and 2.8. This is generally the pH range at which liquid beverages are considered to be refreshing to the palate.

Any suitable food-grade acid or combination of acids may be used to bring the pH into the desired range. Suitable food-grade acids include, but are not limited to, citric acid, malic acid, tartaric acid, lactic acid, ascorbic acid, phosphoric acid and mixtures thereof. In a preferred embodiment, citric acid is used. In an alternate embodiment, fruit juice containing acid may be added to the suspending solution in addition to or in place of the food-grade acid or combination of acids.

If inclusions are present in the suspending solution, they will become suspended in the liquid upon addition of the acid and subsequent mixing. Alternatively, the pre-gel incorporated liquid composition or suspending solution may be acidified to yield a beverage and inclusions may be added to the beverage. In this case, the inclusions will also be suspended upon their addition and subsequent mixing. The entire beverage including the inclusions can be bottled and pasteurized at a temperature of between about 180° and 190° F. for a period of between about 3 and 4 minutes, if desired.

The final gellan content of the beverage is important because beverages must be refreshing. This means that the beverage must not be too syrupy or thick to the palate. This can be accomplished by providing a beverage with inclusions and a gellan gum content of less than about 0.05% by weight of the beverage, preferably less than about 0.035% by weight. At this concentration, the presence of the gellan gum is virtually unnoticeable and yet its suspending properties are those of a much higher concentration of other gums.

The following non-limiting Examples are presented for purposes of illustration only and are not to be construed in a limiting sense.

EXAMPLE 1

Seven and one-half (7.5) grams gellan gum were dry blended with 2.5 g sodium citrate. The blend was added to 1000 ml de-ionized water at room temperature with agitation. When the blend was thoroughly dispersed, the temperature was raised to between abut 180° and 190° F. with agitation and this elevated temperature was maintained for about 3 to 4 minutes until full hydration was achieved. The solution was poured into a suitable container and allowed to cool to ambient temperature (60°–80° F.) to produce a pre-gel solution, which remained a viscous, syrupy liquid.

A syrup was prepared by combining 120 g of high fructose corn syrup and water to yield 700 ml at between 60° F. and 80° F. Thirty (30) ml of pre-gel solution were added to the syrup and the mixture was agitated in a suitable container to yield a pre-gel incorporated liquid composition or suspending solution. Five (5.00) ml of a 50% citric acid solution in water were added slowly to the suspending solution with continuous stirring. Thirty (30) g of grapefruit pulp cells of the type available from Bush Boake Allen Inc., Montvale, N.J. and water were added to yield 1000 ml of a beverage. Upon gentle agitation, the grapefruit pulp cells became suspended in the beverage.

The beverage including suspended grapefruit pulp cells was bottled and pasteurized at between 180° and 190° F. for 3 to 4 minutes.

EXAMPLE 2

A syrup was prepared by combining 120 g of high fructose corn syrup and sufficient water to yield 700 ml at between 60° and 80° F. Thirty (30) ml of pre-gel solution prepared as described in Example 1 were added to the syrup and the mixture was agitated in a suitable container to yield a pre-gel incorporated liquid composition or suspending solution. Five (5.00) ml of a 50% citric acid solution in water were added slowly to the liquid composition with continuous stirring. Thirty (30) g of pieces of a red jelly-like substance or inclusions, 1.50 ml strawberry flavor, and sufficient water to yield 1000 ml were added to produce a beverage. Upon gentle agitation, the red colored inclusions became suspended in the beverage.

The beverage having suspended inclusions was bottled and pasteurized at between 180° and 190° F. for 3 to 4 minutes.

EXAMPLE 3

A syrup was prepared by combining 120 g of high fructose corn syrup and sufficient water to yield 700 ml at between 60° and 80° F. Thirty (30) g of pieces of a red jelly-like substance and 1.5 ml strawberry flavor were added to produce a liquid composition having inclusions. Thirty (30) ml of pre-gel solution prepared as described in Example 1 were added to the liquid composition to yield a pre-gel incorporated liquid composition or suspending solution. Five (5.00) ml of a 50% citric acid solution in water were added slowly to the liquid composition with continuous stirring, followed by addition of sufficient water to yield 1000 ml and produce a beverage. Upon gentle agitation, the red colored inclusions became suspended in the beverage.

The beverage having suspended inclusions was bottled and pasteurized at between 180° and 190° F. for 3 to 4 minutes.

EXAMPLE 4

A syrup was prepared by combining 120 g of high fructose corn syrup and sufficient water to yield 700 ml at between 60° and 80° F. Thirty (30) g lemon pulp cells of the type available from Bush Boak Allen Inc., Montvale, N.J., 0.20 g of natural yellow color, 1 ml of lemon flavor, and 30 ml of pre-gel solution prepared as described in Example 1 were added to the syrup with agitation to yield a suspending solution. Five (5.00) ml of a 50% citric acid solution in water were slowly added to the suspending solution with continuous stirring and sufficient water to yield 1000 ml were also added to produce a beverage. Upon gentle agitation, the lemon pulp cells became suspended in the liquid beverage.

The beverage having suspended lemon pulp cells was bottled and pasteurized at between 180° and 190° F. for 3 to 4 minutes.

EXAMPLE 5

A syrup was prepared by combining 120 g of high fructose corn syrup and sufficient water to yield 700 ml at between 60° and 80° F. One hundred (100) ml of Neutral Grain spirits (50% by volume alcohol content) and 30 ml of pre-gel solution prepared as described in Example 1 were added to the syrup and the mixture was agitated in a suitable container to yield a suspending solution. Five (5.00) ml of a 50% citric acid solution in water were added slowly to the suspending solution with continuous stirring. Thirty (30) g of orange pulp cells and sufficent water to yield 1000 ml were added to produce a beverage. Upon gentle agitation, the orange pulp cells became suspended in the beverage. The beverage including suspended orange pulp cells had an alcohol content of 5% by volume.

EXAMPLE 6

A syrup was prepared by combining 120 g of high fructose corn syrup and sufficient water to yield 700 ml at between 60° and 80° F. Two hundred (200) ml of Neutral Grain spirits (50% by volume alcohol content) and 30 ml of pre-gel solution prepared as described in Example 1 were added to the syrup with agitation and the mixture was agitated in a suitable container to yield a suspending solution. Five (5.00) ml of a 50% citric acid solution in water were added slowly to the suspending solution with continuous stirring. Thirty (30) g pieces of a colored jelly-like substance or inclusions, 0.20 g of a natural red color, and sufficient water were added to yield 1000 ml of a beverage. Upon gentle agitation, the inclusions became suspended in the beverage. The final beverage including suspended inclusions had an alcohol content of 10% by volume.

EXAMPLE 7

A syrup was prepared by combining 120 g of high fructose corn syrup, 22 g of white grape juice concentrate, and sufficient water to yield 700 ml at between 60° and 80° F. Thirty (30) ml of pre-gel solution prepared as described in Example 1 were added to the syrup and the mixture was agitated in a suitable container to yield a suspending solution. Five (5.00) ml of a 50% citric acid solution in water were added slowly to the suspending solution with continuous stirring. Thirty (30) g of lime pulp cells, 1.20 ml lime flavor, and sufficient water to yield 1000 ml were added to produce a beverage. Upon gentle agitation, the lime pulp cells became suspended in the beverage.

The beverage including suspended lime pulp cells was bottled and pasteurized at between 180° and 190° F. for 3 to 4 minutes.

EXAMPLE 8

A syrup was prepared by dissolving 90 g of sucrose in sufficient water to yield 700 ml at between 60° and 80° F. Thirty (30) ml of pre-gel solution prepared as described in Example 1 were added to the syrup and the mixture was agitated in a suitable container to yield a liquid composition. Five (5.00) ml of a 50% citric acid solution in water were added slowly to the suspending solution with continuous stirring. Thirty (30) g of pieces of a red jelly-like substance or inclusions, 0.20 g of red color, 2.0 ml red punch flavor, and sufficient water to yield 1000 ml were added to produce a beverage. Upon gentle agitation, the inclusions became suspended in the beverage.

The beverage including suspended inclusions was bottled and pasteurized at between 180° and 190° F. for 3 to 4 minutes.

EXAMPLE 9

One and eight-tenths (1.80) g of xanthan gum was dry blended with 5.30 g of gellan gum and 2.90 g sodium citrate. The blend was added to 1000 ml de-ionized water at room temperature with agitation. When the blend was thoroughly dispersed, the temperature was raised to between about 180° and 190° F. with agitation and this elevated temperature was maintained for about 3 to 4 minutes until full hydration was achieved. The solution was poured into a suitable container and allowed to cool to ambient room temperature (60°–80° F.) to produce an alternate pre-gel solution, which remained a viscous, syrupy liquid.

A syrup was prepared by combining 120 g of high fructose corn syrup and sufficient water to yield 700 ml at between 60° and 80° F. Forty-five (45) ml of the alternate pre-gel solution were added to the syrup and the mixture was agitated in a suitable container to yield a suspending solution. Five (5.00) ml of a 50% citric acid solution in water were added slowly to the suspending solution with continuous stirring. Thirty (30) g of grapefruit pulp cells, 1.50 ml natural grapefruit flavor, and sufficient water to yield 1000 ml were added. Upon gentle agitation, the grapefruit pulp cells became suspended in the beverage.

The beverage having suspended grapefruit pulp cells was bottled and pasteurized at between 180° and 190° F. for 3 to 4 minutes.

EXAMPLE 10

Seven (7.00) g of lambda carrageenan were dry blended with 3.50 g of gellan gum and 1.20 g sodium citrate. The blend was added to 1000 ml de-ionized water at room temperature with agitation. When the blend was thoroughly dispersed, the temperature was raised to between about 180° and 190° F. with agitation and this elevated temperature was maintained for about 3 to 4 minutes until full hydration was achieved. The solution was poured into a suitable container and allowed to cool to ambient room temperature (60°–80° F.) to produce a second alternate pre-gel solution, which remained a viscous, syrupy liquid.

A syrup was prepared by combining 120 g of high fructose corn syrup and sufficient water to yield 700 ml at between 60° and 80° F. Seventy (70) ml of the second alternate pre-gel solution were added to the syrup with agitation and the mixture was agitated in a suitable container to yield a liquid composition. Five (5.00) ml of a 50% citric acid solution and 15.80 g lemon juice concentrate (400 g per liter acidity as citric) were added slowly to the liquid composition with continuous stirring. Thirty (30) g of lemon pulp cells, 0.20 g of natural yellow color, 1.00 ml natural lemon flavor, and sufficient water to yield 1000 ml were added to produce a beverage. Upon gentle agitation, the lemon pulp cells became suspended in the beverage.

The beverage containing suspended lemon pulp cells was bottled and pasteurized at between 180° and 190° F. for 3 to 4 minutes. The final juice containing beverage remained stable over an extended period of time with no apparent separation of lemon pulp.

As can readily be seen, the method of suspending inclusions provided in accordance with the invention is effective for suspending particulates in a liquid composition. The method uses minimal energy and is efficient for bulk suspension of particulates.

It will thus be seen that the goals set forth above, among those made apparent from the preceding description, are efficiently attained and, since certain changes may be made in carrying out the above method without departing from the spirit and scope of the invention, it is intended that all matter contained in the above description shall be interpreted as illustrative and not in a limiting sense.

It is also understood that the following claims are intended to cover all of the generic and specific features of the invention herein described and all statements of the scope of the invention which, as a matter of language, might be said to fall therebetween.

Particularly it is to be understood that in said claims ingredients or compounds recited in the singular are intended to include compatible mixtures of such ingredients wherever the sense permits.

What is claimed is:

1. A method of suspending inclusions in a liquid comprising the sequential steps of:

preparing a pre-gel solution including between about 0.2% and 1.5% by weight gellan gum in water;

providing a liquid composition having inclusions;

incorporating the pre-gel solution into the liquid composition to form a suspending solution; and, acidifying the suspending solution to produce a beverage and suspend the inclusions in the beverage.

2. The method of suspending inclusions of claim 1 wherein the pre-gel solution includes a sequestrant selected from the group consisting of sodium citrate, potassium citrate, sodium hexametaphosphate, sodium tripolyphosphate and mixtures thereof.

3. The method of suspending inclusions of claim 2 wherein the sequestrant is present in an amount between about 0.1% and 0.5% by weight of the pre-gel solution.

4. The method of suspending inclusions of claim 1 wherein the liquid composition has a neutral pH.

5. The method of suspending inclusions of claim 1 wherein the liquid composition is alcoholic and has an alcohol content between about 5% and 40% by volume.

6. The method of suspending inclusions of claim 1 wherein the liquid composition has inclusions in an amount between about 1% and 10% by weight of the liquid composition.

7. The method of suspending inclusions of claim 1 wherein the inclusions are selected from the group consisting of pieces of a jelled substance, fruit pulp cells, fruit pulp particles, fruit pieces, edible gold particles, droplets of flavoring or clouding agents, and combinations thereof.

8. The method of suspending inclusions of claim 1 wherein the pre-gel solution is incorporated into the liquid composition in an amount between about 2% and 17.5% by volume.

9. The method of suspending inclusions of claim 1 wherein the pre-gel solution is incorporated into the liquid composition at a temperature between about 40° and 120° F.

10. The method of claim 1 wherein the pre-gel solution further comprises an additional gum.

11. The method of claim 10 wherein the additional gum is selected from the group consisting of xanthan gum, carrageenan, carboxy methyl cellulose, locust bean gum, and pectin.

12. The method of claim 11 wherein the additional gum is carrageenan.

13. The method of claim 10 wherein the additional gum is xanthan gum.

14. A method of suspending inclusions in an acidic or alcoholic liquid composition comprising the sequential steps of:

preparing a pre-gel solution including between about 0.2% and 1.5% by weight gellan gum in water;

providing a liquid composition having a neutral pH;

incorporating the pre-gel solution into the liquid composition to form a suspending solution;

adding inclusions to the suspending solution; and, acidifying the suspending solution to produce a beverage and suspend the inclusions in the beverage.

15. The method of suspending inclusions of claim 14 wherein the pre-gel solution includes a sequestrant selected from the group consisting of sodium citrate, potassium citrate, sodium hexametaphosphate, sodium tripolyphosphate, and mixtures thereof.

16. The method of suspending inclusions of claim 15 wherein the sequestrant is present in an amount between about 0.1% and 0.5% by weight of the pre-gel solution.

17. The method of suspending inclusions of claim 14 wherein the liquid composition is alcoholic and has an alcohol content of between about 5% and 40% by volume.

18. The method of suspending inclusions of claim 14 wherein the liquid composition has inclusions in an amount between about 1% and 10% by weight of the liquid composition.

19. The method of suspending inclusions of claim 14 wherein the inclusions are selected from the group consisting of pieces of a jelled substance, fruit pulp cells, fruit pulp particles, fruit pieces, edible gold particles, droplets of flavoring or clouding agents, and combinations thereof.

20. The method of suspending inclusions of claim 14 wherein the pre-gel solution is incorporated into the liquid composition in an amount between about 2% and 17.5% by volume.

21. A method of suspending inclusions in an acidic or alcoholic liquid composition comprising the sequential steps of:
   preparing a pre-gel solution including between about 0.2% and 1.5% by weight gellan gum in water;
   providing a liquid composition having a neutral pH;
   incorporating the pre-gel solution into the liquid composition to form a suspending solution;
   acidifying the suspending solution to produce a beverage;
   adding inclusions to the beverage; and, agitating the beverage to suspend the inclusions in the beverage.

22. The method of suspending inclusions of claim 21 wherein the pre-gel solution includes a sequestrant selected from the group consisting of sodium citrate, potassium citrate, sodium hexamethaphosphate, sodium tripolyphosphate, and mixtures thereof.

23. The method of suspending inclusions of claim 22 wherein the sequestrant is present in an amount between about 0.1% and 0.5% by weight of the pre-gel solution.

24. The method of suspending inclusions of claim 21 wherein the liquid composition is alcoholic and has an alcohol content of between about 5% and 40% by volume.

25. The method of suspending inclusions of claim 21 wherein the liquid composition has inclusions in an amount between about 1% and 10% by weight of the liquid composition.

26. The method of suspending inclusions of claim 21 wherein the inclusions are selected from the group consisting of pieces of a jelled substance, fruit pulp cells, fruit pulp particles, fruit pieces, edible gold particles, droplets of flavoring or clouding agents, and combinations thereof.

27. The method of suspending inclusions of claim 21 wherein the pre-gel solution is incorporated into the liquid composition in an amount between about 2% and 17.5% by volume.

* * * * *